UNITED STATES PATENT OFFICE.

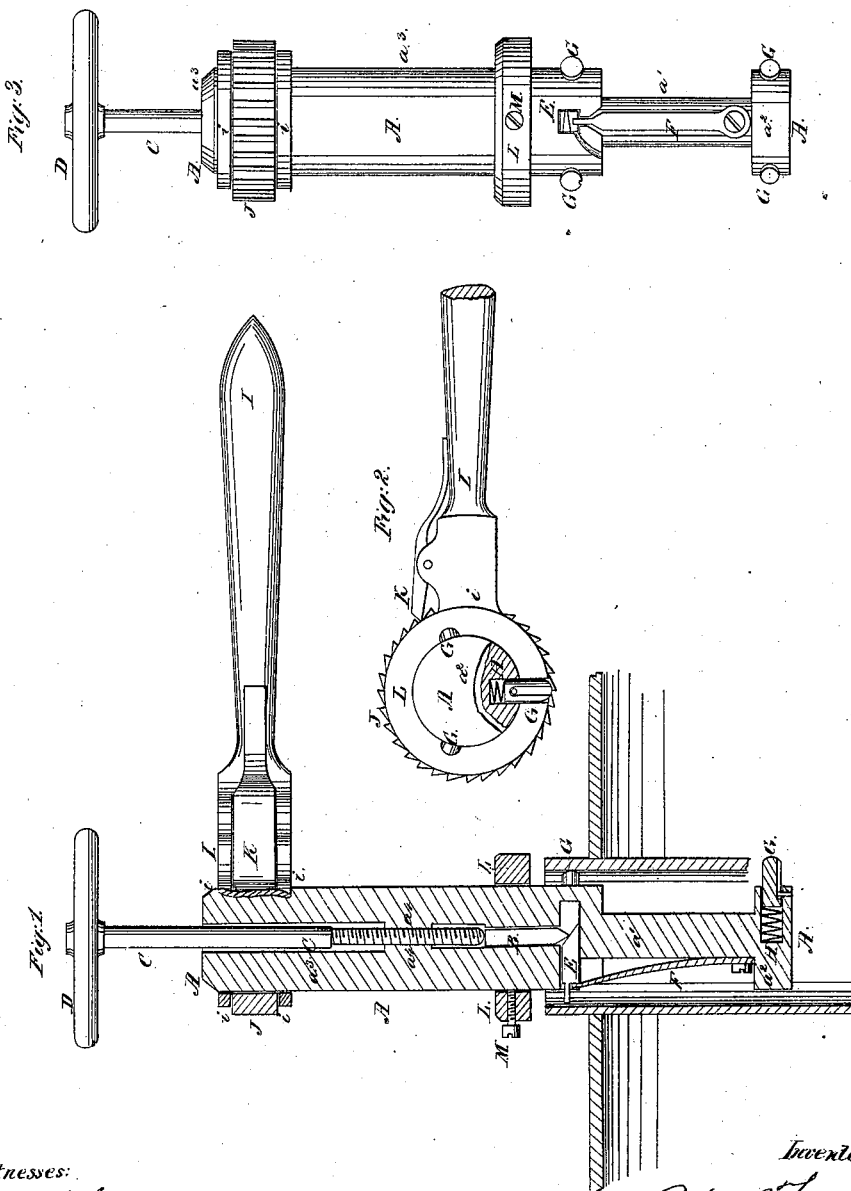

NICHOLAS THOMAS, OF CHICAGO, ILLINOIS.

IMPROVED TOOL FOR CUTTING OFF BOILER-TUBES.

Specification forming part of Letters Patent No. 55,391, dated June 5, 1866.

*To all whom it may concern:*

Be it known that I, NICHOLAS THOMAS, of Chicago, in the county of Cook and State of Illinois, have invented a new and Improved Tool for Cutting Off Boiler-Tubes; and I do hereby declare that the following is a full, clear, and exact description thereof, which will enable others skilled in the art to make and use the same, reference being had to the accompanying drawings, forming a part of this specification, in which—

Figure 1 is a central longitudinal section of my improved tool for cutting off boiler-tubes. Fig. 2 is a lower-end view of the same, part being broken away to show the construction of the blocks and springs for steadying the cutter while at its work. Fig. 3 is a side view of the same.

Similar letters of reference indicate like parts.

My invention has for its object to furnish a tool by means of which boiler-tubes may be cut off while in their place without difficulty; and it consists of a tool constructed and arranged as hereinafter more fully described.

A is the main body or stock of the tool, the lower part, $a'$, of which is turned down so as to be smaller than the other parts to allow space for the chips or turnings, but leaving the lower end, $a^2$, of the same size as the upper part, $a^3$. In one side of the lower end of the part $a^3$ is formed a square hole, as seen in Figs. 1 and 3, extending nearly through the said part. The part $a^3$ is also perforated longitudinally from its upper end, the said perforation leading into and terminating at the square hole formed in the side of the said part, as before described. Upon a portion, $a^4$, of the inner surface of the perforation, at about the middle of the part $a^3$, is cut a screw-thread, as shown in Fig. 1, and the said perforation both above and below the screw-thread $a^4$ is chambered out or enlarged, as shown. In the lower chamber thus formed is placed a small plug, B, having an inclined or wedge-shaped lower end, as seen in Fig. 1.

C is the feed-screw, upon the lower end of which is cut a screw-thread, $a^4$. The feed-screw C is operated by a hand-wheel, D, as shown.

E is the cutter, the lower part or body of which is made square, so as to fit into the square hole formed in the side of the part $a^3$, as before described. Upon the upper end of this cutter is formed the cutting-point, as shown in Fig. 1, leaving a shoulder, upon which rests the end of the spring F. The other end of this spring is screwed fast to the lower end of the part $a'$, as shown, and its object is to hold the cutter E down in its place, except when forced up by the feed-screw C, in the manner hereinafter described.

G are blocks set in holes formed in the part $a^2$ and in the lower part of the part $a^3$. These blocks are held out by springs H, placed in the bottoms of the holes, and pushing against the inner ends of the said blocks G, as seen in Figs. 1 and 2. The object of the blocks is to hold the tool firmly and steadily in its place within the tube while doing its work. These blocks G should be sufficient in number to keep the tool steady, and all or a sufficient number of them for accomplishing this object should be furnished with springs H.

I is the handle for operating the tool. The lower end, $i$, of this handle is perforated so as to fit over the end of the part $a^3$, as seen in the drawings. It is also slotted so as to receive the ratchet-wheel J within said slot. The ratchet-wheel J also fits over the end of the part $a^3$, as seen, and it is kept in place and from turning upon the part $a^3$ by a projection (not shown in the drawings) formed on the said part and fitting into a groove formed upon the inner surface of the said ratchet-wheel.

K is a pawl, the upper end of which is a spring resting against the side of the handle I and forcing the lower end against the teeth of the wheel. By moving the handle I in one direction the pawl K takes hold of the teeth of the ratchet-wheel and revolves the shaft or stock A. By moving it in the other direction the pawl slips over the teeth without turning the ratchet-wheel. Thus by moving the handle I alternately in opposite directions the work is accomplished.

The tool may be operated by a crank or in any other convenient manner; but I prefer to operate it by a ratchet, as described, as being most convenient.

L is a collar working freely upon the part $a^3$, and held in any desired position by the set-screw M. In using the tool the collar is set at the same distance from the cutter E, as it is desired the cut should be from the end of the tube. The lower end of the tool is then inserted into the tube with the collar L resting against its end. The tool is then revolved by means of the handle I, the cutter being kept constantly up to its work by the feed-screw C.

I claim as new and desire to secure by Letters Patent—

An improved tool for cutting off boiler-tubes, constructed and arranged substantially as herein described, and for the purpose set forth.

NICHOLAS THOMAS.

Witnesses:
GEORGE M. FURNESS,
JOSEPH FINCH.